United States Patent
Xu et al.

(10) Patent No.: US 12,281,789 B2
(45) Date of Patent: Apr. 22, 2025

(54) LIGHT GUIDE PLATE AND BACKLIGHT MODULE THEREOF

(71) Applicant: DARWIN PRECISIONS CORPORATION, Hsinchu County (TW)

(72) Inventors: Jia Wei Xu, Hsinchu County (TW); Wen-Tai Shen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/372,713

(22) Filed: Sep. 26, 2023

(65) Prior Publication Data

US 2024/0280241 A1    Aug. 22, 2024

(30) Foreign Application Priority Data

Feb. 16, 2023 (TW) ................. 112105601

(51) Int. Cl.
  F21V 5/00      (2018.01)
  F21V 8/00      (2006.01)
  G02F 1/13357   (2006.01)
(52) U.S. Cl.
  CPC ............ F21V 5/007 (2013.01); G02B 6/0081 (2013.01); G02B 6/009 (2013.01); G02F 1/1336 (2013.01)
(58) Field of Classification Search
  CPC ....... F21V 5/007; G02F 1/1336; G02B 6/009; G02B 6/0081
  See application file for complete search history.

(56) References Cited

U.S. PATENT DOCUMENTS

| 11,061,279 B2* | 7/2021 | Woodgate | G02B 19/0066 |
| 2021/0199875 A1* | 7/2021 | Okahisa | H01L 33/58 |
| 2022/0099880 A1* | 3/2022 | Hashimoto | G02B 6/0078 |

FOREIGN PATENT DOCUMENTS

| TW | I442356 B | 6/2014 |
| TW | I653477 B | 3/2019 |
| TW | I655480 B | 4/2019 |
| TW | I710833 B | 11/2020 |

* cited by examiner

*Primary Examiner* — Evan P Dzierzynski
*Assistant Examiner* — Nathaniel J Lee (57) ABSTRACT

A light guide plate has a bottom surface and a light-emitting surface opposite to the bottom surface, and comprises light-guiding lenses, accommodating regions, and separating portions. The light-guiding lenses are arranged along a first direction and a second direction, and form a light-guiding lens array, where the first direction is perpendicular to the second direction, and the first direction and the second direction are parallel to the bottom surface and the light-emitting surface. The accommodating regions are arranged in the light-guiding lenses, respectively, and are configured to dispose at least one light-emitting component. Each of the separating portions is located between adjacent two of the light-guiding lenses, and the plurality of light-guiding lenses are arranged along the first direction or the second direction on two sides of each of the separating portions. The present invention further provides a backlight module.

13 Claims, 11 Drawing Sheets

LIGHT GUIDE PLATE AND BACKLIGHT MODULE THEREOF

FIELD OF THE INVENTION

The present invention relates to a light guide plate, and more particularly to a light guide plate for a surface light source, and a backlight module.

BACKGROUND OF THE INVENTION

At present, in some planar backlight sources, such as LCD backlight sources and Mini LED backlight structures, light-guiding lenses are used as a means of guiding light, and replace optical distances (ODs), to achieve uniform light distribution and thickness reduction. Holes for disposing LEDs are provided in the light-guiding lenses. Based on considerations such as light utilization and expansion and contraction of a material of the light-guiding lenses, the holes are appropriate in size. In addition, the light-guiding lenses are substantially in the form of a single lens or an integral lens. The single lens has problems of time consumption, high cost and the like in backlight manufacturing, and the integral lens easily causes collision damage to the LEDs due to the expansion and contraction of the material.

SUMMARY OF THE INVENTION

The present invention provides a light guide plate, which contributes to simplifying the assembly of a backlight module. The light guide plate according to the present invention has lower degree of expansion and contraction due to temperature change, which contributes to maintaining the flatness in the backlight module and avoiding or reducing the situation that the light guide plate interferes with light-emitting components.

The light guide plate provided by the present invention has a bottom surface and a light-emitting surface opposite to the bottom surface, and comprises a plurality of light-guiding lenses, a plurality of accommodating regions, and a plurality of separating portions. The plurality of light-guiding lenses are arranged along a first direction and a second direction, and form a light-guiding lens array, where the first direction is perpendicular to the second direction, and the first direction and the second direction are parallel to the bottom surface and the light-emitting surface. The plurality of accommodating regions are arranged in the light-guiding lenses, respectively, and are configured to dispose at least one light-emitting component. Each of the separating portions is located between adjacent two of the plurality of light-guiding lenses, and the plurality of light-guiding lenses are arranged along the first direction or the second direction on two sides of each of the separating portions.

In an embodiment of the present invention, the above light guide plate has a first length in the first direction; the plurality of separating portions comprise a plurality of first separating portions, and each of the first separating portions extends along the second direction; and the plurality of light-guiding lenses are arranged along the second direction on two sides of each of the first separating portions, respectively.

In an embodiment of the present invention, the above light guide plate is provided with the first separating portions at every a first distance in the first direction, and a length of the first distance is calculated according to the following function: progressive increment of expansion=thermal expansion coefficient of light guide plate*temperature change*length of first distance, where the progressive increment of expansion is an amount of expansion of the light guide plate due to temperature rise under the temperature change, and the progressive increment of expansion is less than or equal to an assembly tolerance.

In an embodiment of the present invention, the above first separating portions further comprise a second separating portion and a third separating portion, and a length of the second separating portion is greater than a length of the third separating portion; and the second separating portion is arranged in the light guide plate, and the third separating portion extends to an edge of the light guide plate.

In an embodiment of the present invention, the above light guide plate has a first length in the first direction and a second length in the second direction, and the first length is greater than the second length; the plurality of separating portions comprise at least one fourth separating portion, and each of the at least one fourth separating portion extends along the first direction; and the plurality of light-guiding lenses are arranged along the first direction on two sides of the fourth separating portion, respectively.

In an embodiment of the present invention, the above light guide plate further has a plurality of fourth separating portions, and is provided with the fourth separating portions at every a first distance in the second direction; and a length of the first distance is calculated according to the following function: progressive increment of expansion=thermal expansion coefficient of light guide plate*temperature change*length of first distance, where the progressive increment of expansion is an amount of expansion of the light guide plate due to temperature rise under the temperature change, and the progressive increment of expansion is less than or equal to an assembly tolerance.

In an embodiment of the present invention, the plurality of fourth separating portions above are further partially overlapped in the second direction; and the overlapped portion has a third length in the first direction, and the third length is greater than one third of the first length.

In an embodiment of the present invention, the at least one fourth separating portion above is arranged in the light guide plate, and a length of the at least one fourth separating portion is greater than two third of the first length.

In an embodiment of the present invention, a length of the at least one fourth separating portion above is smaller than half of the first length, and the at least one fourth separating portion extends to an edge of the light guide plate.

In an embodiment of the present invention, the plurality of accommodating regions above are further a plurality of accommodating grooves, and each of the accommodating grooves has an opening located on the bottom surface of the light guide plate.

The present invention further provides a backlight module. The backlight module provided by the present invention comprises the light guide plate as described above and a plurality of light-emitting components. The plurality of light-emitting components are disposed in the plurality of accommodating regions, respectively, where a gap is provided between each of the light-emitting components and each of the accommodating regions.

Due to the use of the plurality of separating portions in the present invention, there is room for deformation and extension or retraction of a material of the light guide plate, so that the light guide plate has lower degree of expansion and contraction due to temperature change and thus can be kept flat, and the light-emitting components can be free from interference, collision, or falloff. The plurality of separating portions in the present invention do not disperse the light guide plate into a plurality of parts, so that the dimensional integrity of the light guide plate can be maintained, thereby contributing to simplifying the assembly of the backlight module.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
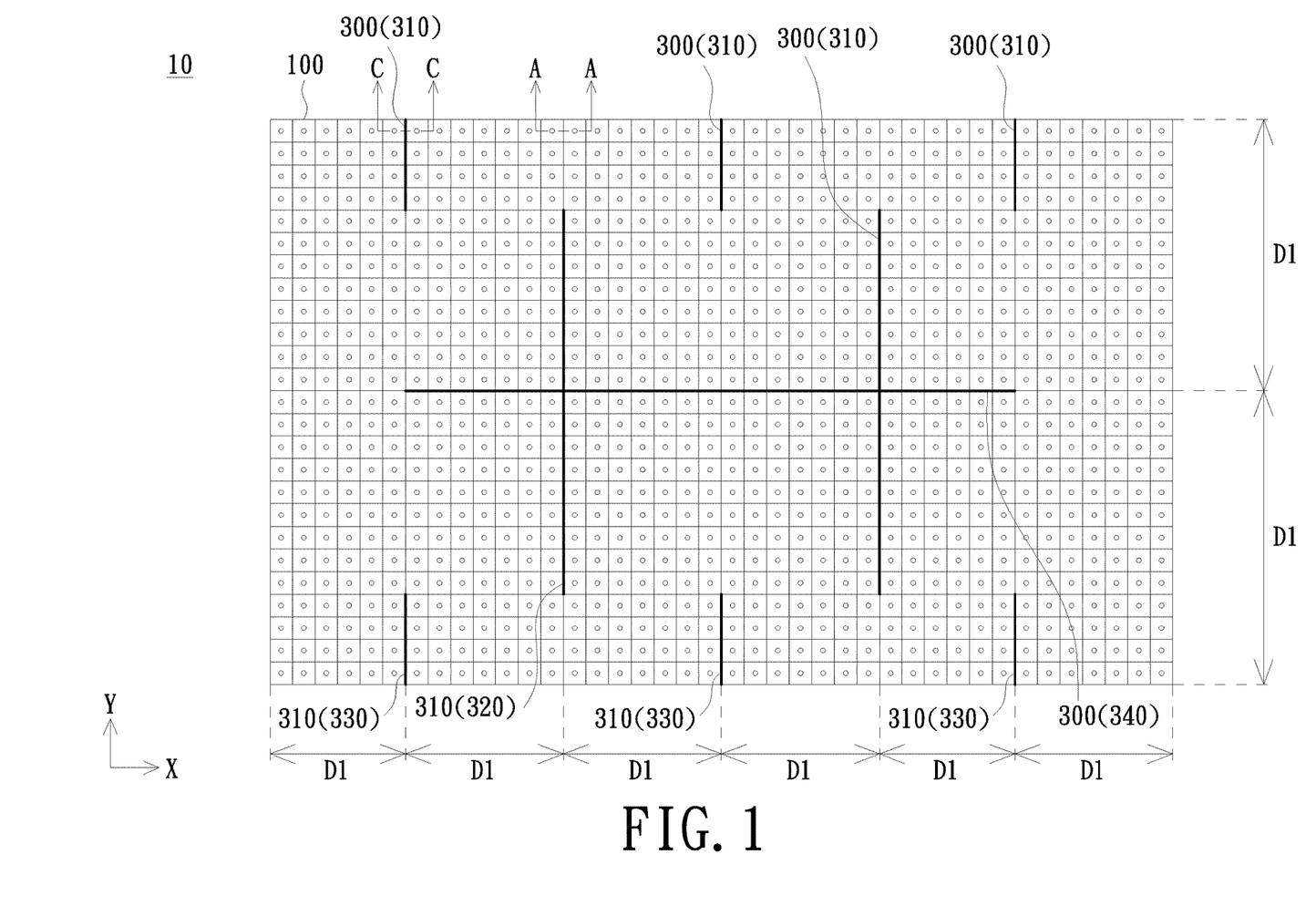
FIG. 1 is a schematic top view of a light guide plate according to an embodiment of the present invention.
Figure 2:
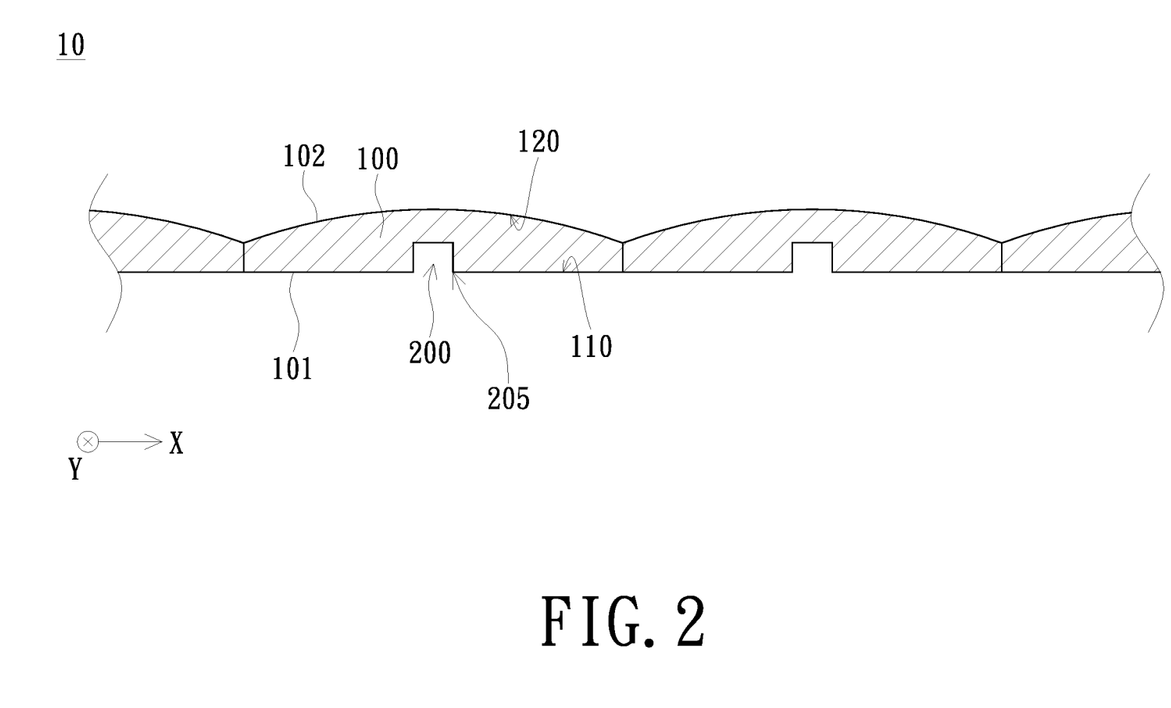
FIG. 2 is a schematic sectional view along a section line A-A in FIG. 1.

FIG. 1 is a schematic top view of a light guide plate according to an embodiment of the present invention. FIG. 2 is a schematic sectional view along a section line A-A in FIG. 1. As shown in FIGS. 1 to 2, in the embodiment of the present invention, the light guide plate 10 has a bottom surface 101 and a light-emitting surface 102 opposite to the bottom surface 101, and comprises a plurality of light-guiding lenses 100. Further, the light guide plate 10 can be composed of the plurality of light-guiding lenses 100. In several embodiments of the present invention, the light guide plate 10 can be equivalent to a light-guiding lens array comprising the plurality of light-guiding lenses 100. As shown in FIG. 1, the plurality of light-guiding lenses 100 are substantially arranged in rows and columns along a first direction X and a second direction Y. In a preferred embodiment of the present invention, the light-guiding lenses 100 are substantially rectangular or square, but are not limited thereto. As shown in FIG. 2, each of the light-guiding lenses 100 has a bottom surface 110 and a light-emitting surface 120 opposite to the bottom surface 110. Preferably, the light-emitting surface 120 can be an outer convex surface. In the embodiments of FIGS. 1 to 2, edges of the light-emitting surfaces 120 of the adjacent light-guiding lenses 100 are connected to each other in principle, but are not limited thereto.

Figure 3:
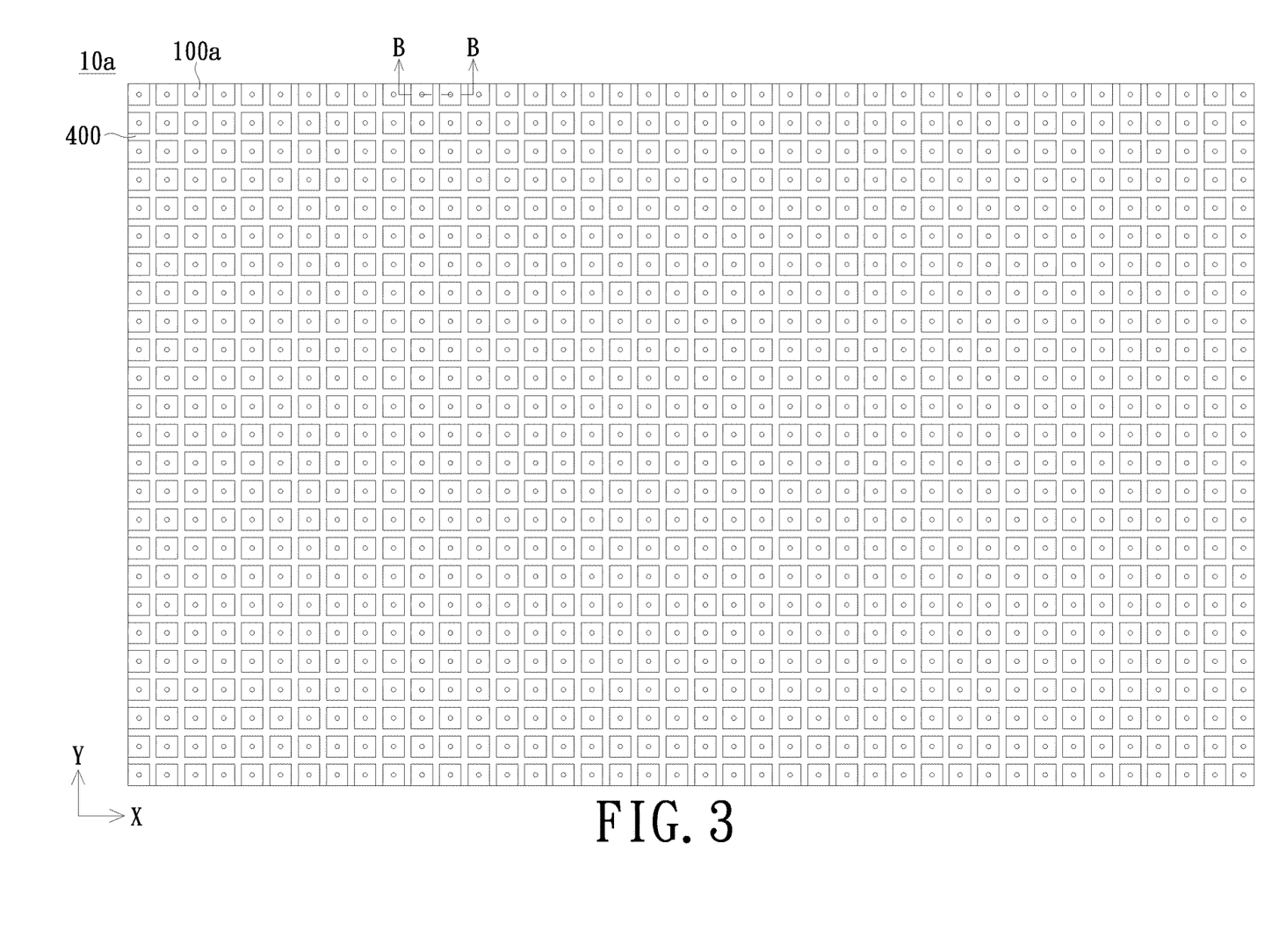
FIG. 3 is a schematic top view of a light guide plate according to another embodiment of the present invention.
Figure 4:
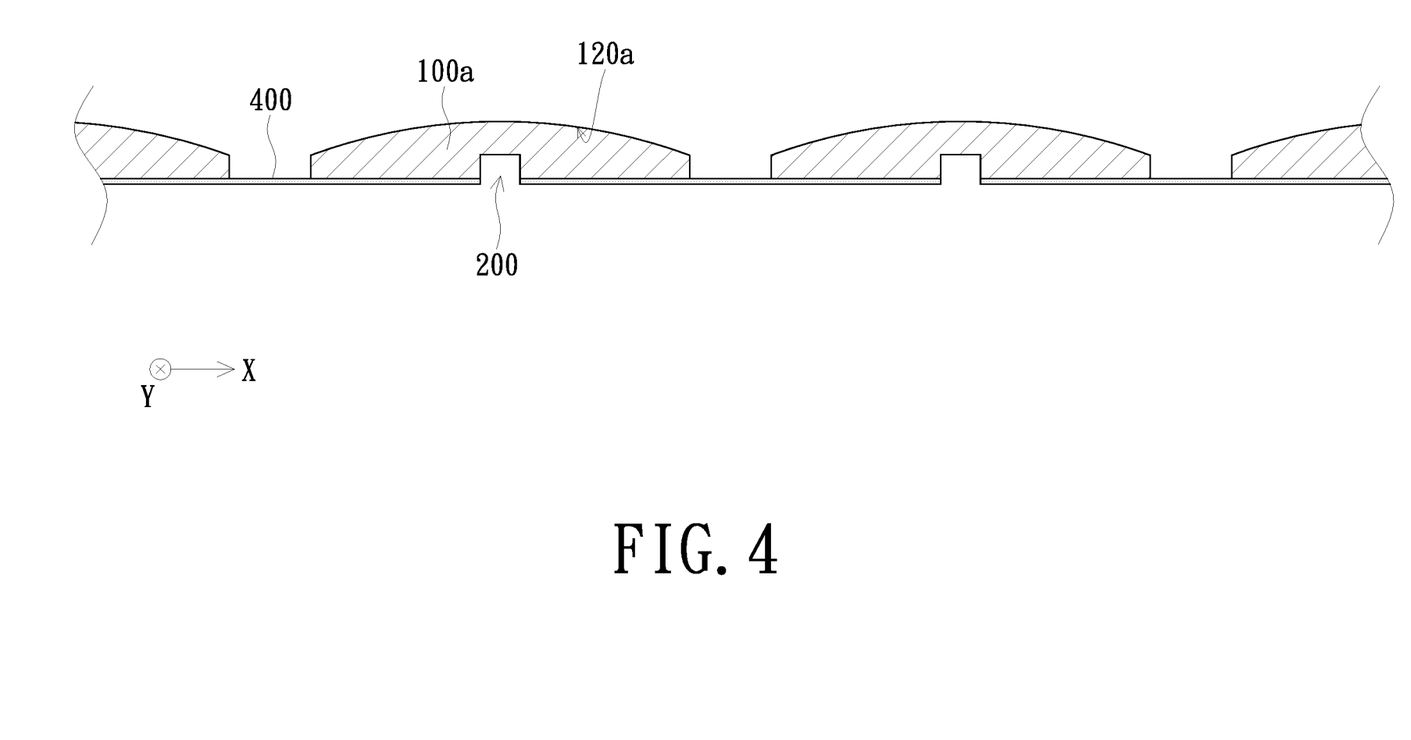
FIG. 4 is a schematic sectional view along a sectional line B-B in FIG. 3.

FIG. 3 is a schematic top view of a light guide plate according to another embodiment of the present invention. FIG. 4 is a schematic sectional view along a section line B-B in FIG. 3. As shown in FIGS. 3 to 4, the light guide plate 10*a* comprises the plurality of light-guiding lenses 100*a* and a bottom 400, where the plurality of light-guiding lenses 100*a* are substantially arranged in rows and columns along the first direction X and the second direction Y. A difference from the embodiment shown in FIGS. 1 to 2 is that the plurality of light-guiding lenses 100*a* are arranged at the bottom 400, and the adjacent light-guiding lenses 100*a* are spaced from each other, and the light-emitting surfaces 120*a* are not connected to each other.

As shown in FIG. 2, the light guide plate 10 further has a plurality of accommodating regions 200 arranged in the light-guiding lenses 100, respectively. The accommodating regions 200 can be used to dispose light-emitting components (described later). The accommodating region 200 can be in a form of, for example, an accommodating groove. For example, the accommodating grooves are formed in the light-guiding lenses 100. Each of the accommodating grooves has an opening 205, and the opening 205 is preferably located on the bottom surface 101 of the light guide plate 10. The light-emitting components can be disposed in the accommodating grooves through the openings 205. When the light-emitting components are accommodated in the accommodating regions 200, gaps are provided between the light-emitting components and the accommodating regions 200. The gaps can still be maintained between the light-emitting components and the accommodating regions 200 even if the light guide plate 10 may expand or contract due to temperature change. In addition, the accommodating region 200 is not limited to the form of the accommodating groove. For example, the accommodating regions 200 can also be accommodating holes. The accommodating region 200 can be in a form of any structure that can be used to dispose the light-emitting component and is adapted to allow light emitted from the light-emitting components to enter the light guide plate 10 as expected.

Figure 5:
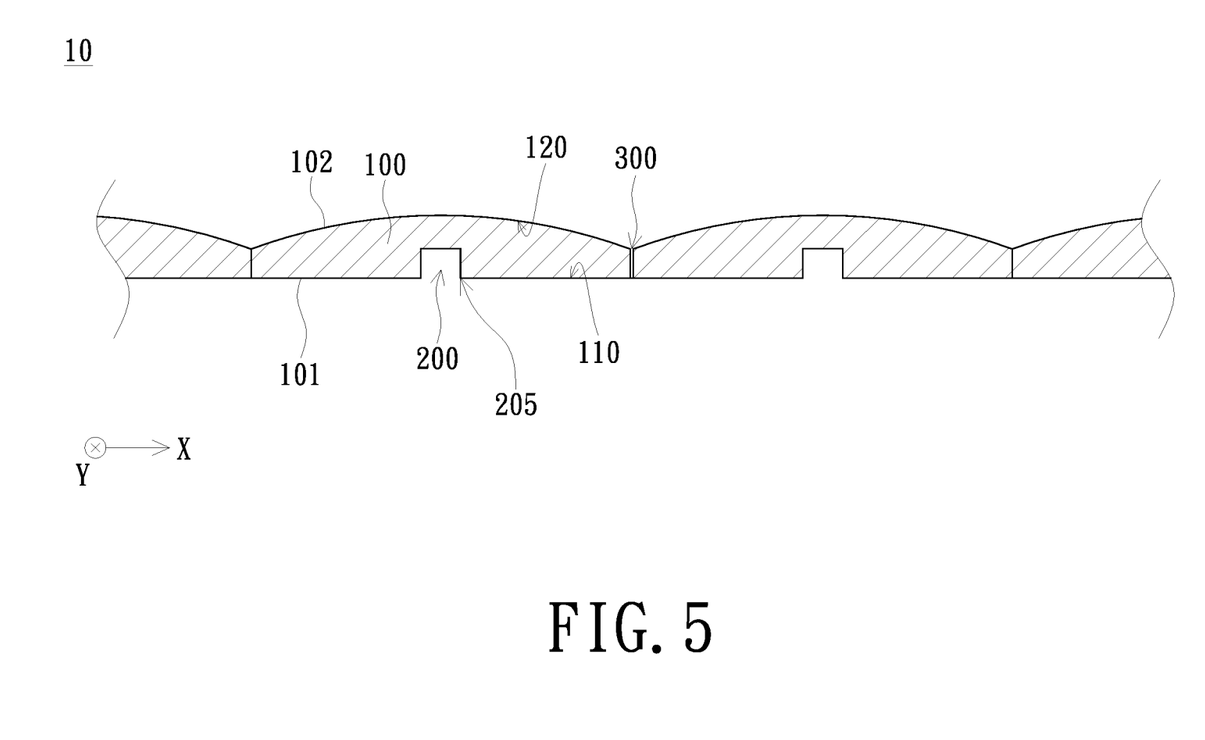
FIG. 5 is a schematic sectional view along a sectional line C-C in FIG. 1.

FIG. 5 is another schematic sectional view of the embodiment shown in FIGS. 1 to 2. As shown in FIGS. 1 and 5, the light guide plate 10 further has a plurality of separating portions 300. In other words, the light guide plate 10 according to the embodiment of the present invention has a plurality of portions that are not connected integrally. It may be seen that the plurality of portions that are not connected integrally do not cause the light guide plate 10 to be dispersed into a plurality of parts. In a preferred embodiment of the present invention, the separating portions 300 are linear and extend, for example, along the first direction X or the second direction Y. The separating portions 300 do not pass through the light-guiding lenses 100 in principle, but each of the separating portions is preferably located between adjacent two of the light-guiding lenses 100. For example, when the separating portions 300 extend along the first direction X, the plurality of light-guiding lenses 100 arranged along the first direction X are provided on two sides of each of the separating portions, respectively, and when the separating portions 300 extend along the second direction Y, the plurality of light-guiding lenses 100 arranged along the second direction Y are provided on two sides of each of the separating portions, respectively. In addition, as shown in FIG. 1 and FIG. 5, the light-guiding lenses 100 on two opposite sides of each of the separating portions 300 are not connected to each other, or are partially connected to each other. Based on the plurality of separating portions 300 in the light guide plate 10, the degree of expansion and contraction of the light guide plate 10 due to temperature change can be alleviated.

Further, progressive increase of expansion may occur during temperature change. When there are a greater number of connected light-guiding lenses 100 or the light guide plate 10 is longer, greater progressive increase of expansion may be caused. Due to the fact that the light guide plate 10 according to the embodiment of the present invention has the plurality of separating portions 300, the light guide plate 10 is segmented into a plurality of shorter parts, and the number of connected light-guiding lenses 100 is reduced, thereby alleviating the degree of progressive increment of expansion. In summary, based on the arrangement of the separating portions 300, the light guide plate 10 has lower degree of expansion and contraction due to temperature change. Due to the fact that the light guide plate 10 has lower degree of expansion and contraction, when the light-emitting components are arranged in the accommodating regions 200, the existence of the gaps between the light-emitting components and the accommodating regions 200 and an appropriate gap size can be ensured, and the deformation of the light guide plate 10 can be avoided or reduced (described later).

As shown in FIG. 1, the separating portions 300 further comprise a plurality of first separating portions 310 extending along the second direction Y. In a preferred embodiment of the present invention, the light guide plate 10 is substantially rectangular, and has a first length L1 in the first direction X and a second length L2 in the second direction Y, where the first length L1 is greater than the second length L2. The first separating portions 310 can be arranged at every a first distance D1 in the first direction X. In other words, the adjacent first separating portions 310 are separated by the first distance D1 in the first direction X, and a short side of the light guide plate 10 is separated from the closest first separating portion 310 by the first distance D1.

A length of the first distance D1, for example, can be less than 40% of the first length L1. In a preferred embodiment of the present invention, the length of the first distance D1 can be more dependent on the following parameters, such as a thermal expansion coefficient of a material of the light guide plate, and an expected temperature change ($\Delta T$), and a progressive increment of expansion of the light guide plate 10 in the first direction X. The progressive increment of expansion is an amount of expansion of the light guide plate 10 due to temperature rise under the temperature change $\Delta T$. Preferably, the progressive increment of expansion is based on an allowable assembly tolerance. The assembly tolerance refers to an error caused due to the assembly of the light guide plate 10 and the light-emitting components, and can be, for example, a sum of length errors of the light guide plate 10 in the first direction X. Further, the progressive increment of expansion preferably does not exceed the allowable assembly tolerance. The following is an example of the length of the first distance D1 in the light guide plate 10 with the parameters shown in Table 1.

TABLE 1

| Thermal expansion coefficient | $5.00 * 10^{-5}$ |
|---|---|
| Temperature change ($\Delta T$) | 45° C. (70-25° C.) |
| Allowable assembly tolerance | 0.3 mm |

When the length of the first distance D1 is shorter, a length of segments in the light guide plate 10 is shorter, so that the progressive increment of expansion is smaller. A function for the progressive increment of expansion is as follows:

Progressive increment of expansion=thermal expansion coefficient*temperature change ($\Delta T$)*length of first distance $D1$.

The progressive increment of expansion can be calculated from the function, and when "the length of the first distance D1" is not greater than 133 mm, "the progressive increment of expansion" is able to not exceed the allowable assembly tolerance of "0.3 mm".

In several embodiments of the present invention, for example, the allowable assembly tolerance between the light guide plate 10 and the plurality of light-emitting components is ±0.3 mm, where the accommodating regions 200 are the accommodating grooves with an inner diameter of about 2 mm, and can be used to accommodate the light-emitting components with a size of about 1*1 mm. In other words, even if the assembly tolerance of ±0.3 mm occurs, there are still the gaps between the light-emitting components and the accommodating regions 200, and the light-emitting components do not interfere with inner walls of the accommodating grooves, thereby further avoiding or reducing the deformation of the light guide plate 10.

In a preferred embodiment of the present invention, a number of the first separating portions can be determined through the above function and the first length L1. For example, when the light guide plate 10 with the parameters shown in Table 1 has the first length L1 of about 350 mm, the length of the segments can be less than 133 mm by at least two first separating portions 310. Comparatively, if the light guide plate is not provided with the separating portions 300, the progressive increment of expansion calculated according to the above function is approximately 0.78 mm, greater than the allowable assembly tolerance of 0.3 mm, and therefore is unacceptable. In summary, the separating portions 300 really contribute to lowering the amount of expansion of the light guide plate 10 and reducing a difference between the light guide plate 10 and a design value thereof. A smaller amount of expansion contributes to improving and avoiding interference between the light guide plate 10 and other components such as the light-emitting components, a substrate, and a light panel.

All of the first separating portions 310 can be arranged in the light guide plate 10 or extend to an edge of the light guide plate 10, or part of the first separating portions 310 extend to the edge of the light guide plate 10. As shown in FIG. 1, the plurality of first separating portions 310 can further comprise a second separating portion 320 and a third separating portion 330, and a length of the second separating portion 320 is greater than a length of the third separating portion 330. In the embodiment of FIG. 1, the second separating portion 320 is arranged in the light guide plate 10, and the third separating portion 330 extends to the edge of the light guide plate 10. The second separating portion 320 and the third separating portion 330 can be staggered as shown in FIG. 1, but are not limited thereto. The embodiment of FIG. 1 further has a plurality of third separating portions 330 arranged on two opposite long sides of the light guide plate 10, respectively. In addition, in the embodiment of FIG. 1, adjacent second separating portions 320 are separated by the first distance D1. The length of the first distance D1 is as described above.

In several embodiments of the present invention, the separating portions 300 can also comprise at least one fourth separating portion 340 extending along the first direction X. The fourth separating portions 340 can be arranged at every the first distance D1 in the second direction Y, but are not limited thereto. As shown in FIG. 1, the light guide plate 10 further comprises the fourth separating portions 340, where the two opposite long sides of the light guide plate 10 are separated from the fourth separating portions 340 by the first distance D1. The length of the first distance D1 is as described above. In the embodiment of FIG. 1, the fourth separating portions 340 are arranged in the light guide plate 10 and pass through the second separating portion 320, but the present invention is not limited thereto.

Figure 6:
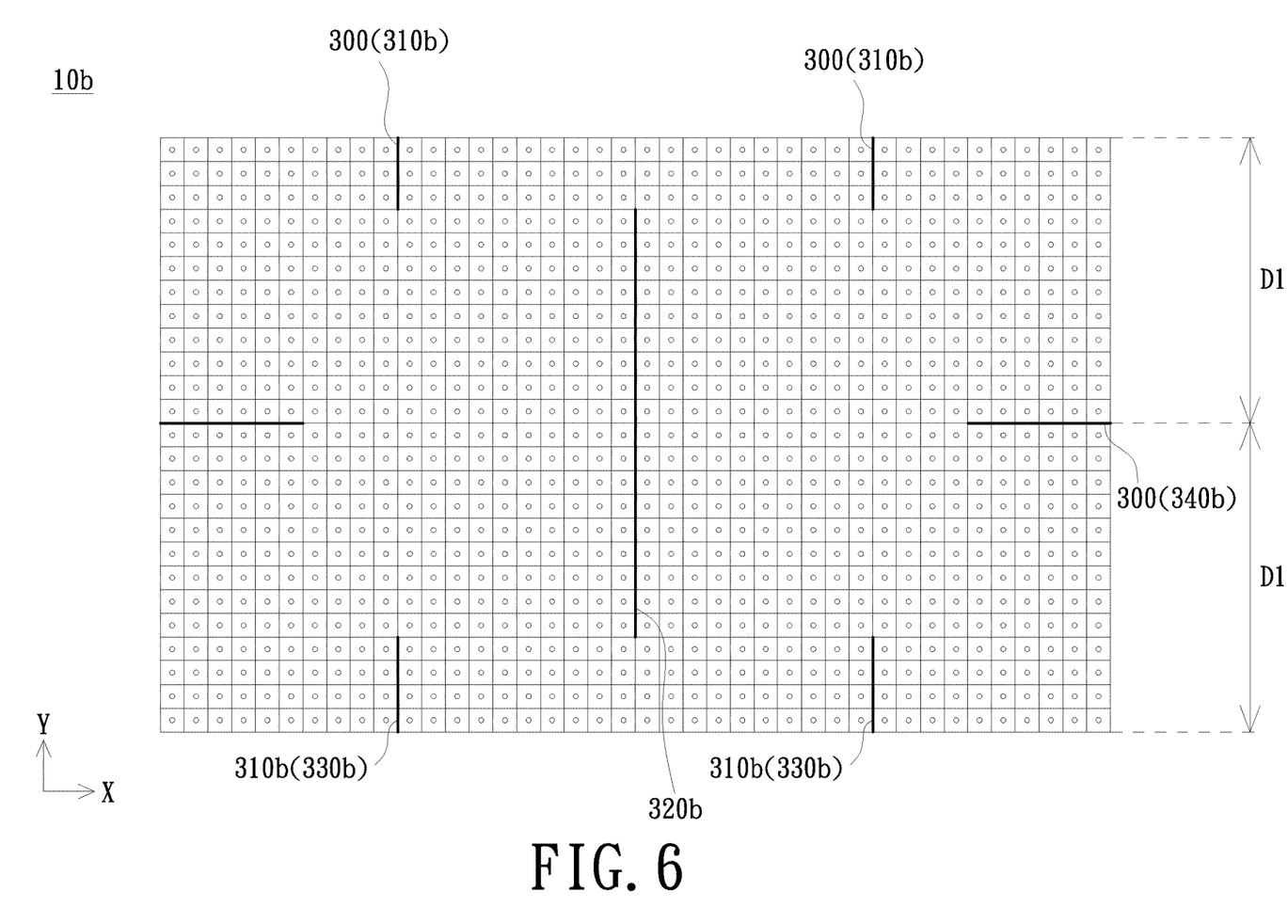
FIG. 6 is a schematic top view of a light guide plate according to another embodiment of the present invention.

FIG. 6 is a schematic top view of a light guide plate according to another embodiment of the present invention. A difference between the embodiment of FIG. 6 and the above embodiment is that the light guide plate 10b has a plurality of fourth separating portions 340b. The fourth separating portions 340b are separated from any long side of the light guide plate 10b by the first distance D1 as described above, and the plurality of fourth separating portions 340 are separated from one another in the first direction X. Further, the difference between the embodiment of FIG. 6 and the above embodiment is that there are a smaller number of second separating portions 320b and third separating portions 330b, and the fourth separating portions 340b are located on two opposite short sides of the light guide plate 10b, respectively, and extend to edges of the short sides, without passing through the second separating portions 320b. In the embodiment of FIG. 6, a length of the fourth separating portions 340b is smaller than half of the first length L1, but the present invention is not limited thereto.

Figure 7:
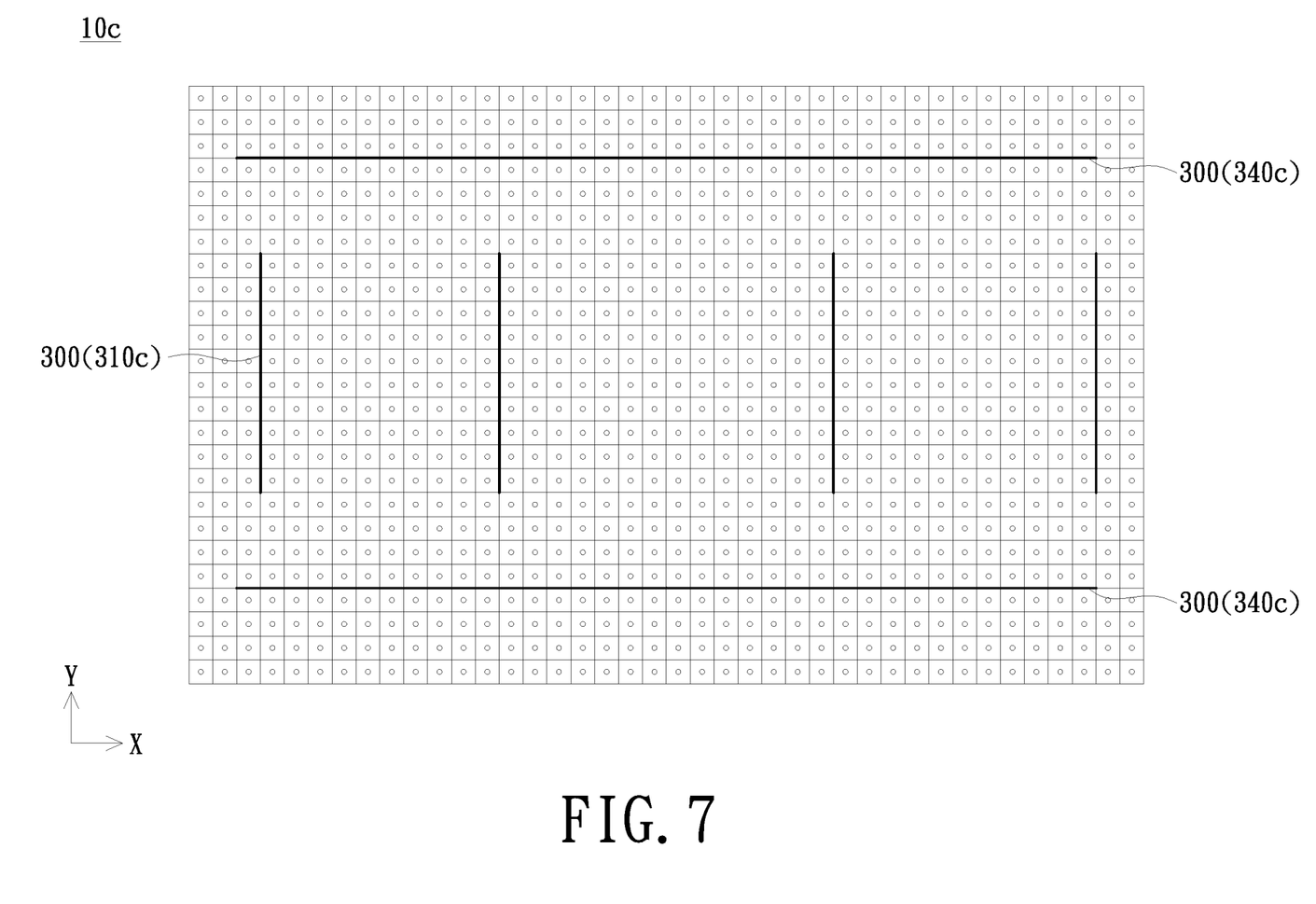
FIG. 7 is a schematic top view of a light guide plate according to another embodiment of the present invention.

FIG. 7 is a schematic top view of a light guide plate according to another embodiment of the present invention. A difference between the embodiment of FIG. 7 and the above embodiments is that the fourth separating portions 340c are arranged in the light guide plate 10c and are located on two opposite long sides of the light guide plate 10c, respectively, where a length of the fourth separating portions 340c is greater than two third of the first length L1, but the present invention is not limited thereto. Further, the difference between the embodiment of FIG. 7 and the above embodiments is that all of the first separating portions 310c are arranged in the light guide plate 10c and located between the fourth separating portions 340c.

Figure 8:
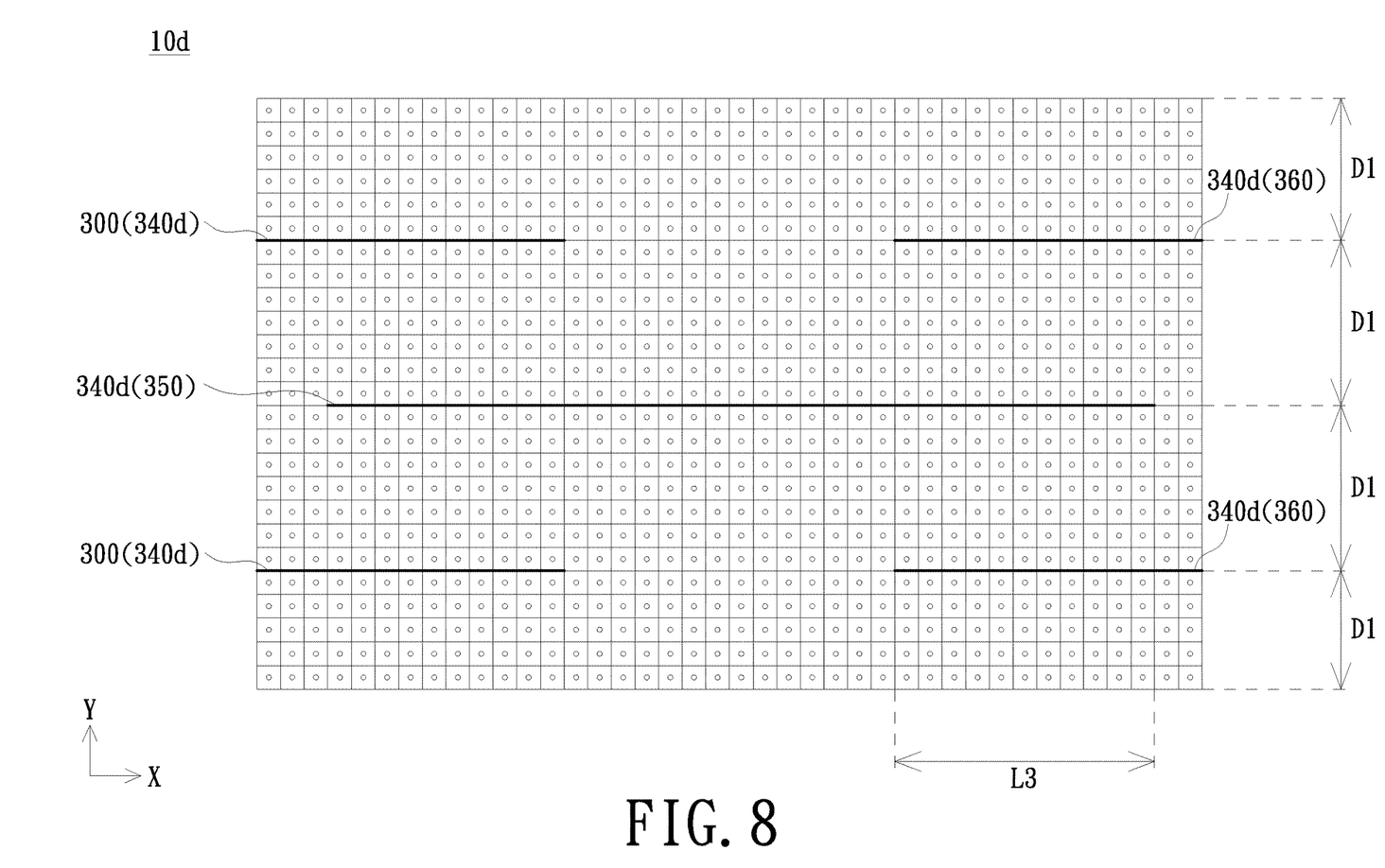
FIG. 8 is a schematic top view of a light guide plate according to another embodiment of the present invention.

FIG. 8 is a schematic top view of a light guide plate according to another embodiment of the present invention. A difference between the embodiment of FIG. 8 and the above embodiments is that the light guide plate 10d only has the fourth separating portions 340d. The fourth separating portions 340d are arranged at every the first distance D1 in the second direction Y. The fourth separating portions 340d further comprise fifth separating portions 350 and sixth separating portions 360, where a length of the fifth separating portions 350 is greater than a length of the sixth separating portions 360. In the embodiment of FIG. 8, the fifth separating portions 350 are arranged in the light guide plate 10d, and the sixth separating portions 360 extend to the edge of the light guide plate 10d, but are not limited thereto. The fifth separating portions 350 and the sixth separating portions 360 can be staggered as shown in FIG. 8, but are not limited thereto.

In the embodiment of FIG. 8, the fifth separating portions 350 and the sixth separating portions 360 are further partially overlapped in the second direction Y. Preferably, the overlapped portion has a third length L3 in the first direction X. The third length L3 is preferably greater than one third of the first length L1. By taking the first length L1 of 350 mm as an example, the third length L3 is, for example, over 123 mm. In this embodiment and other embodiments, even if the light guide plate 10d is not provided with first separating portions, the overlap between the fifth separating portions 350 and the sixth separating portions 360 can reduce the number of connected light-guiding lenses 100 in the light guide plate 10d, thereby contributing to alleviating the progressive increment of expansion.

Figure 9:
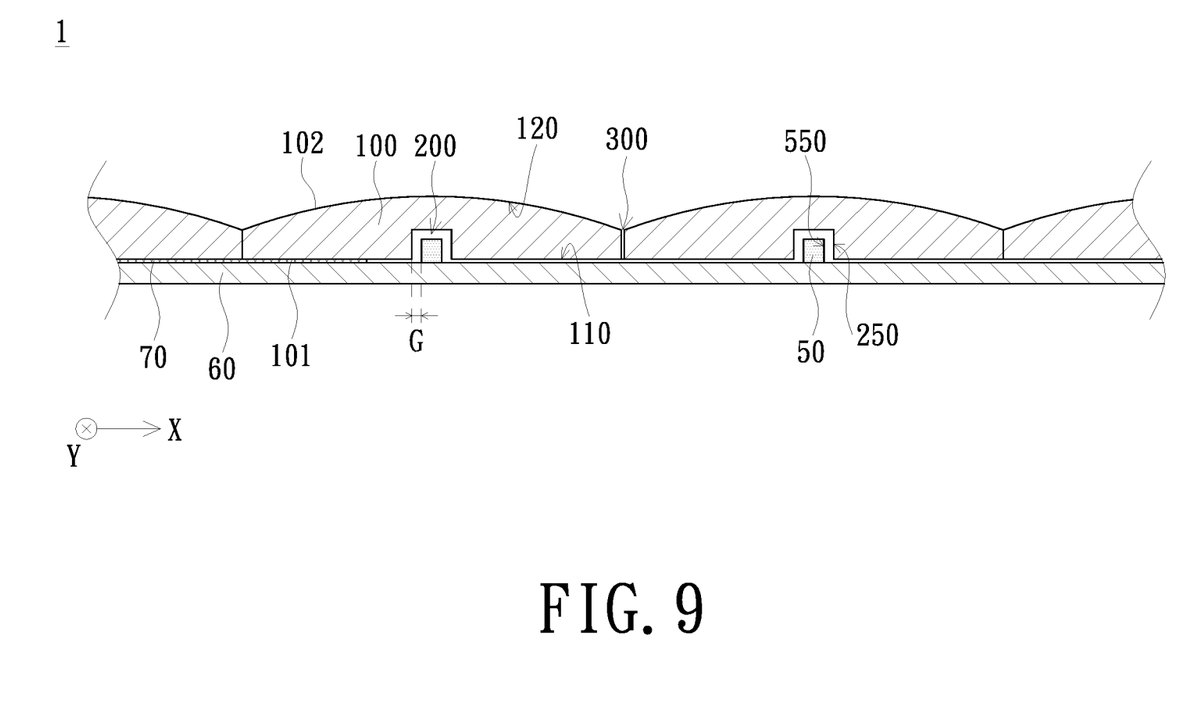
FIG. 9 is a schematic sectional view of a backlight module according to an embodiment of the present invention.

The present invention further provides a backlight module. FIG. 9 is a schematic sectional view of a backlight module according to an embodiment of the present invention. As shown in FIG. 9, the backlight module 1 comprises a light guide plate 10 and a plurality of light-emitting components 50. The plurality of light-emitting components 50 are disposed in the plurality of accommodating regions 200 of the light guide plate 10, respectively, and a gap G is provided between each of the light-emitting components 50 and each of the accommodating regions 200. The light guide plate 10 is only an example for the backlight module 1. In other words, the light guide plates other than the light guide plate 10, such as the light guide plates 10b, 10c, and 10d, can be used for the backlight module according to the embodiment of the present invention.

As shown in FIG. 9, each of the light-emitting components 50 has at least one light-emitting face 550, and each of the accommodating regions 200 has at least one light incident face 250 facing the light-emitting face 550. In several embodiments of the present invention, each of the light-emitting components 50 has a total of five light-emitting faces 550 located on four sides and at a top. In a preferred embodiment of the present invention, the light-emitting components 50 are, for example, light-emitting diodes (LEDs), and preferably, sub-millimeter light-emitting diodes (Mini LEDs).

As shown in FIG. 9, the backlight module 1 preferably further includes a substrate 60 and a plurality of adhesive pieces 70. For example, the substrate 60 can be such as a flexible circuit board or a carrier board. The plurality of light-emitting components 50 are disposed on the substrate 60 and can be controlled through the substrate 60 to be switched on or off to emit light. The plurality of adhesive pieces 70 are disposed between the light guide plate 10 and the substrate 60, and connect the light guide plate 10 to the substrate 60. For example, the adhesive pieces 70 can be such as adhesive tapes or glue.

Figure 10:
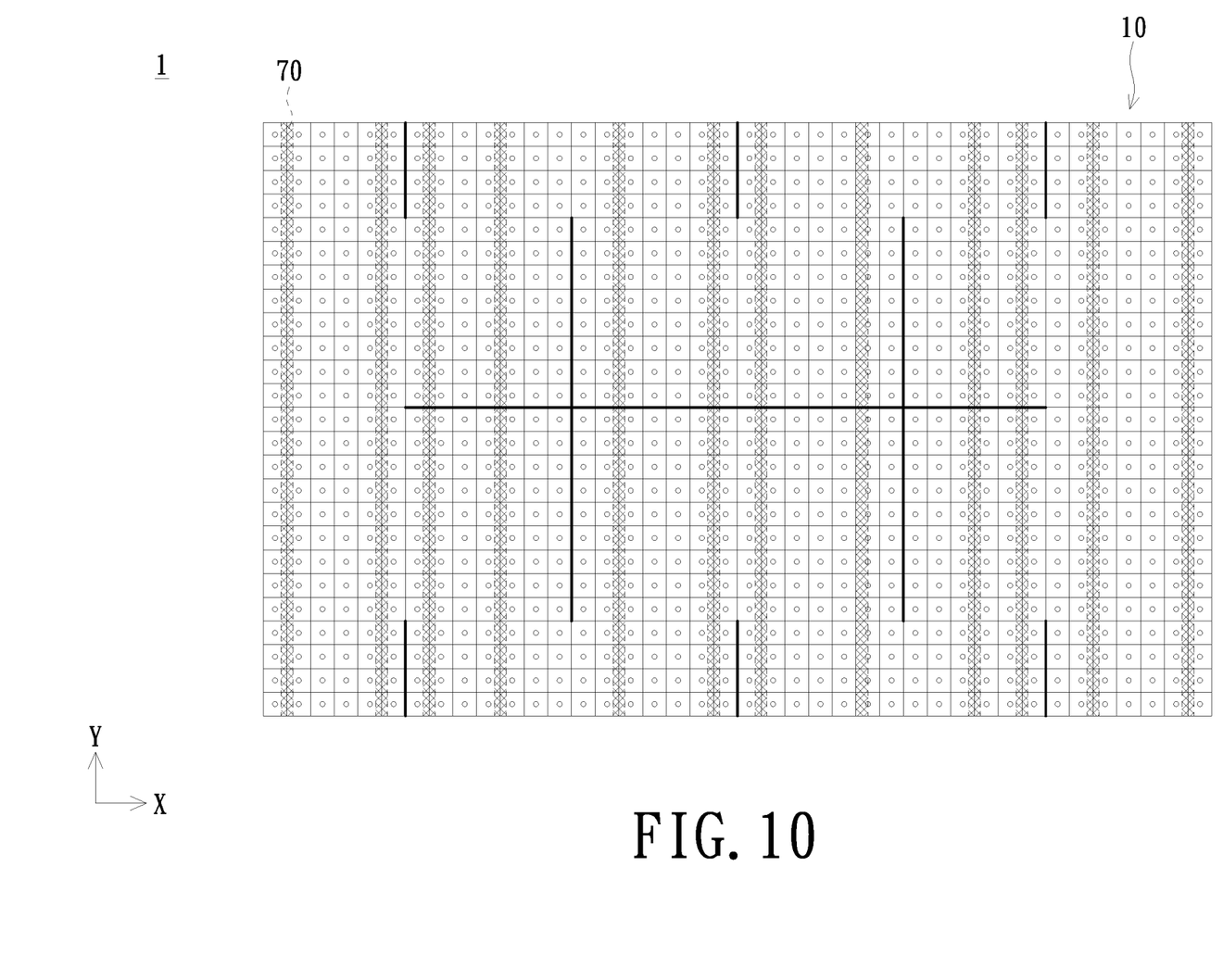
FIG. 10 is a schematic top view of a backlight module according to an embodiment of the present invention.
Figure 11:
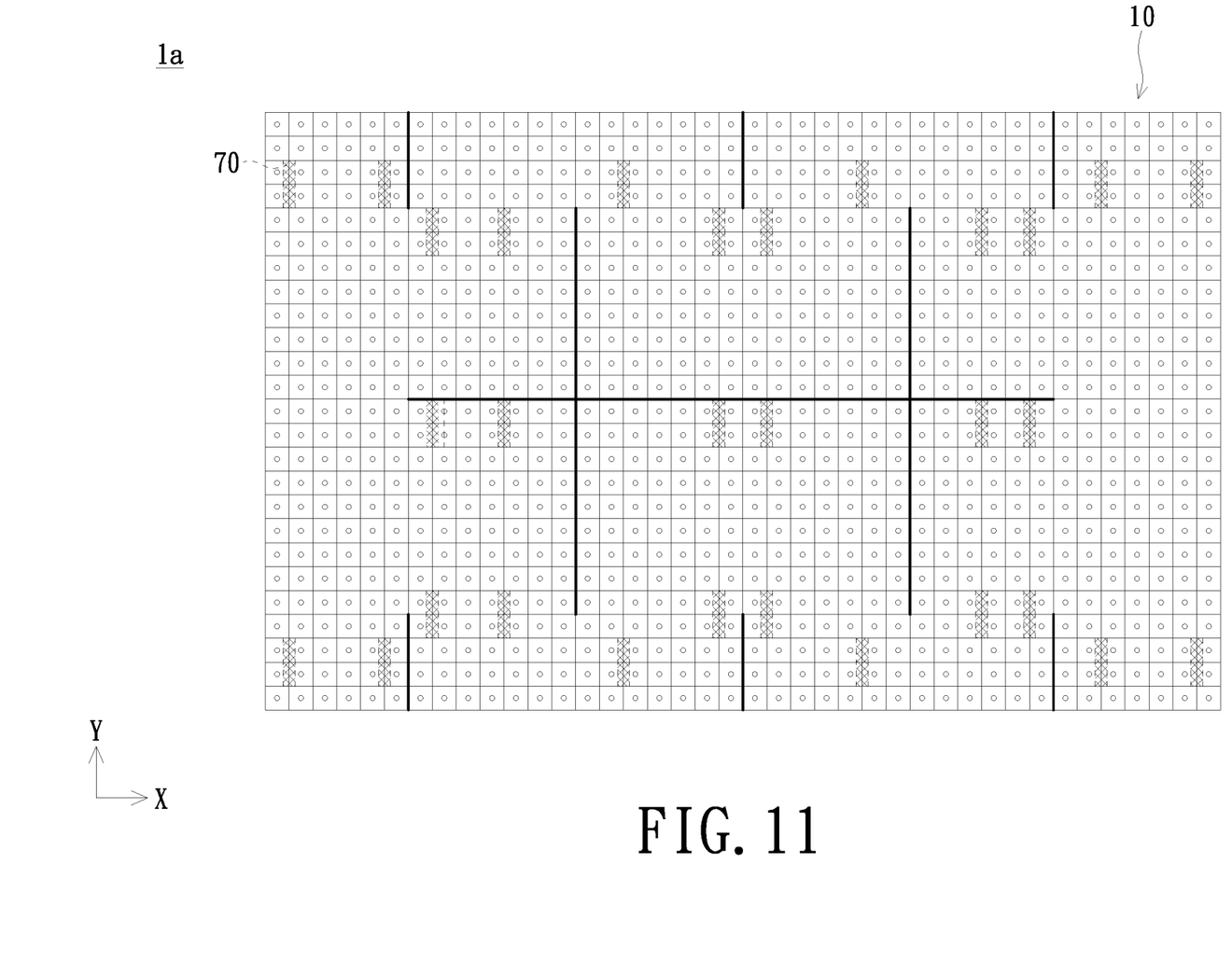
FIG. 11 is a schematic top view of a backlight module according to an embodiment of the present invention.

FIG. 10 is a schematic top view of a backlight module according to an embodiment of the present invention, where the adhesive pieces 70 are presented in a perspective manner and can be adhesive tapes. FIG. 11 is a schematic top view of a backlight module according to another embodiment of the present invention, where the adhesive pieces 70 are glue dots. FIGS. 10 to 11 are only examples, and positions of the adhesive pieces 70 are not limited thereto. In a preferred embodiment of the present invention, since the adhesive pieces 70 can restrict the light guide plate 10 onto the substrate 60, it contributes to limiting the degree of expansion and contraction of the light guide plate 10. The adhesive pieces 70 can be disposed in cooperation with positions of the separating portions 300.

The backlight module 1 and the backlight module 1a according to the embodiments of the present invention adopt the light guide plate 10, and the amount of expansion of the light guide plate 10 can be smaller due to the separating portions 300. Therefore, even if the substrate 60 and the light guide plate 10 provided with the light-emitting components 50 may expand or contract to varying degrees under temperature change, the dimensional error caused by the expansion of the substrate 60 and the light guide plate 10 can be smaller. In this way, relative positions of the light-emitting components 50 and the accommodating regions 200 are less affected, thereby avoiding or reducing the interference between the light-emitting components 50 and the light guide plate 10.

According to the present invention, appearance changes of the light guide plate 10 and the interference between the light-emitting components 50 and the light guide plate 10 when the backlight module 1 is at −40° C. to 70° C. are further tested. Based on the warpage of the light guide plate 10 at −40° C. to 70° C., test results show that the separating portions 300 can avoid or reduce the appearance changes of the light guide plate 10, such as deformation. At −40° C. to 70° C., the light-emitting components 50 do not fall off due to the interference of the light guide plate 10. In summary, the embodiment of the present invention can maintain the dimensional integrity of the light guide plate 10, thereby contributing to simplifying the assembly of the backlight module 1. For example, the bonding and assembly of the light guide plate 10 and the substrate 60 can be completed at one time. Due to the arrangement of the separating portions 300 in the embodiment of the present invention, there is room for deformation and extension or retraction of the material of the light guide plate 10, so that the light guide plate 10 has lower degree of expansion and contraction due to temperature change and thus can be kept flat, and the light-emitting components 50 can be free from interference, collision, or falloff.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light guide plate having a first length in a first direction and a second length in a second direction, and having a bottom surface and a light-emitting surface opposite to the bottom surface, and comprising:
   a plurality of light-guiding lenses; wherein the plurality of light-guiding lenses are integrally formed and have the same shape and the same size; the plurality of light-guiding lenses are arranged along a first direction and a second direction, and form a light-guiding lens array, wherein the first direction is orthogonal to the second direction, and the first direction and the second direction are parallel to the bottom surface and the light-emitting surface, and some of the plurality of light-guiding lenses are connected to each other;
   a plurality of accommodating regions, arranged in the plurality of light-guiding lenses, respectively, and configured to dispose at least one light-emitting component; and
   a plurality of separating portions, each of the separating portions extending along the first or the second direction, and being located between adjacent two of the plurality of light-guiding lenses, and the plurality of light-guiding lenses being arranged along the first direction or the second direction on two sides of each of the separating portions; wherein the adjacent two light-guiding lenses on both sides of each of the separating portions are disconnected from each other.

2. The light guide plate according to claim 1, wherein the light guide plate has a first length in the first direction; the plurality of separating portions comprise a plurality of first separating portions, and each of the first separating portions extends along the second direction; and the plurality of light-guiding lenses are arranged along the second direction on two sides of each of the first separating portions, respectively.

3. The light guide plate according to claim 2, wherein the light guide plate is provided with the first separating portions at every a first distance in the first direction, and a length of the first distance is calculated according to the following function:

$$\text{progressive increment of expansion} = \text{thermal expansion coefficient of light guide plate} * \text{temperature change} * \text{length of first distance}$$

wherein the progressive increment of expansion is an amount of expansion of the light guide plate due to temperature rise under the temperature change, and the progressive increment of expansion is less than or equal to an assembly tolerance; wherein the temperature change is 45° C. or less.

4. The light guide plate according to claim 2, wherein the plurality of first separating portions further comprise a second separating portion and a third separating portion, and a length of the second separating portion is greater than a length of the third separating portion; and the second separating portion is arranged in the light guide plate, and the third separating portion extends to an edge of the light guide plate.

5. The light guide plate according to claim 1, wherein the light guide plate has a first length in the first direction and a second length in the second direction, and the first length is greater than the second length; the plurality of separating portions comprise at least one fourth separating portion, and each of the at least one fourth separating portion extends along the first direction; and the plurality of light-guiding lenses are arranged along the first direction on two sides of the fourth separating portion, respectively.

6. The light guide plate according to claim 5, wherein the light guide plate further has a plurality of fourth separating portions, and is provided with the fourth separating portions at every a first distance in the second direction; and a length of the first distance is calculated according to the following function:

$$\text{progressive increment of expansion} = \text{thermal expansion coefficient of light guide plate} * \text{temperature change} * \text{length of first distance}$$

wherein the progressive increment of expansion is an amount of expansion of the light guide plate due to temperature rise under the temperature change, and the progressive increment of expansion is less than or equal to an assembly tolerance.

7. The light guide plate according to claim 6, wherein the plurality of fourth separating portions are further partially overlapped in the second direction; and the overlapped portion has a third length in the first direction, and the third length is greater than one third of the first length.

8. The light guide plate according to claim 5, wherein the at least one fourth separating portion is arranged in the light guide plate, and a length of the at least one fourth separating portion is greater than two third of the first length.

9. The light guide plate according to claim 5, wherein a length of the at least one fourth separating portion is smaller than half of the first length, and the at least one fourth separating portion extends to an edge of the light guide plate.

10. The light guide plate according to claim 1, wherein the plurality of accommodating regions are further a plurality of accommodating grooves, and each of the accommodating grooves has an opening located on the bottom surface of the light guide plate.

11. A backlight module, comprising:
a light guide plate having a first length in a first direction and a second length in a second direction, and having a bottom surface and a light-emitting surface opposite to the bottom surface, and comprising:
a plurality of light-guiding lenses; wherein the plurality of light-guiding lenses are integrally formed and have the same shape and the same size; the plurality of light-guiding lenses are arranged along a first direction and a second direction, and form a light-guiding lens array, wherein the first direction is orthogonal to the second direction, and the first direction and the second direction are parallel to the bottom surface and the light-emitting surface, and some of the plurality of light-guiding lenses are connected to each other;
a plurality of accommodating regions, arranged in the plurality of light-guiding lenses, respectively, and configured to dispose at least one light-emitting component; and
a plurality of separating portions, each of the separating portions extending along the first or the second direction, and being located between adjacent two of the plurality of light-guiding lenses, and the plurality of light-guiding lenses being arranged along the first direction or the second direction on two sides of each of the separating portions; and
a plurality of light-emitting components, disposed in the plurality of accommodating regions, respectively, wherein a gap is provided between each of the light-emitting components and each of the accommodating regions; wherein the adjacent two light-guiding lenses on both sides of each of the separating portions are disconnected from each other.

12. The backlight module according to claim 11, wherein each of the light-emitting components has at least one light-emitting face, and each of the accommodating regions has at least one light incident face facing the at least one light-emitting face.

13. The backlight module according to claim 11, further comprising a substrate and a plurality of adhesive pieces, wherein the plurality of light-emitting components are disposed on the substrate, and the plurality of adhesive pieces are disposed between the light guide plate and the substrate, and connect the light guide plate to the substrate.

* * * * *